(12) United States Patent
Balakrishnan et al.

(10) Patent No.: US 11,314,629 B2
(45) Date of Patent: Apr. 26, 2022

(54) SYSTEMS AND METHODS FOR REMOTE MOBILE DEVELOPMENT AND TEST FEEDBACK

(71) Applicant: JPMORGAN CHASE BANK, N.A., New York, NY (US)

(72) Inventors: Swaroop Kumar Balakrishnan, Bengaluru (IN); Ramesh Kumar Appusamy, Tirupur District (IN); Naveen Kumar Ponnuswamy, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/099,447

(22) Filed: Nov. 16, 2020

(65) Prior Publication Data
US 2021/0200664 A1    Jul. 1, 2021

(30) Foreign Application Priority Data

Nov. 27, 2019   (IN) .............................. 201911048688

(51) Int. Cl.
*G06F 9/44*    (2018.01)
*G06F 11/36*   (2006.01)

(52) U.S. Cl.
CPC ...... *G06F 11/3688* (2013.01); *G06F 11/3676* (2013.01); *G06F 11/3684* (2013.01); *G06F 11/3692* (2013.01)

(58) Field of Classification Search
CPC ............. G06F 11/3688; G06F 11/3692; G06F 11/3676; G06F 11/3684
See application file for complete search history.

(56) References Cited

U.S. PATENT DOCUMENTS

| | | | | |
|---|---|---|---|---|
| 9,021,443 B1* | 4/2015 | Lachwani | ........... | G06F 11/3664 717/127 |
| 9,268,668 B1* | 2/2016 | Lachwani | ........... | G06F 11/3688 |
| 9,626,164 B1* | 4/2017 | Fuchs | ........ | G06F 8/36 |
| 2007/0006036 A1* | 1/2007 | Devas | ..................... | G06F 11/36 714/38.14 |
| 2009/0249121 A1* | 10/2009 | Kube | .................... | G06F 11/263 714/32 |
| 2014/0331209 A1* | 11/2014 | Singh | .................. | G06F 11/3688 717/127 |

(Continued)

*Primary Examiner* — Wei Y Zhen
*Assistant Examiner* — Amir Soltanzadeh
(74) *Attorney, Agent, or Firm* — Greenberg Traurig LLP

(57) ABSTRACT

Systems and methods for remote mobile development and test feedback are disclosed. According to one embodiment, in an electronic device testing apparatus comprising at least one computer processor, a method for remote mobile development and test feedback may include: (1) receiving a test request comprising one or more tests to conduct on at least one electronic device in a device farm; (2) parsing the one or more test requests to identify the features to be tested; (3) identifying one or more test scripts that encompasses the features to be tested; (4) identifying a required software configuration on the at least one electronic device to conduct the one or more test; (5) installing the required software configuration on the at least one electronic device; (6) executing the test features; and (7) storing results of the test features.

14 Claims, 2 Drawing Sheets

(56) References Cited

U.S. PATENT DOCUMENTS

| | | | |
|---|---|---|---|
| 2015/0113331 A1* | 4/2015 | Bhattacharya | G06F 11/3688 714/38.1 |
| 2017/0262361 A1* | 9/2017 | Francis | G06F 11/3672 |
| 2018/0067844 A1* | 3/2018 | Conti | G06F 11/3672 |
| 2018/0089068 A1* | 3/2018 | Bhojan | G06F 8/61 |

* cited by examiner

SYSTEMS AND METHODS FOR REMOTE MOBILE DEVELOPMENT AND TEST FEEDBACK

RELATED APPLICATIONS

This application claims priority to, and the benefit of, Indian Patent Application No. 201911048688 filed Nov. 27, 2019, the disclosure of which is hereby incorporated, by reference, in its entirety.

BACKGROUND OF THE INVENTION

1. Field of the Invention

Embodiments are directed to systems and methods for remote mobile development and test feedback.

2. Description of the Related Art

Mobile device or Internet of Things ("IoT") development and testing currently requires a physical connection with a physical device. There is capability for remote devices due to platform restrictions and limitations. Due to the large variety of platforms and devices, it is not possible to develop, debug and test mobile apps on all devices or platforms, which results in bugs due to compatibility anomalies.

SUMMARY OF THE INVENTION

Systems and methods for remote mobile development and test feedback are disclosed. According to one embodiment, in an electronic device testing apparatus comprising at least one computer processor, a method for remote mobile development and test feedback may include: (1) receiving a test request comprising one or more tests to conduct on at least one electronic device in a device farm; (2) parsing the one or more test requests to identify the features to be tested; (3) identifying one or more test scripts that encompasses the features to be tested; (4) identifying a required software configuration on the at least one electronic device to conduct the one or more test; (5) installing the required software configuration on the at least one electronic device; (6) executing the test features; and (7) storing results of the test features.

In one embodiment, the method may further include prioritizing the features to be tested.

In one embodiment, the features to be tested may be prioritized based on a prior test result.

In one embodiment, the method may further include identifying a current software configuration on the at least one electronic device, and the step of installing the required software configuration on the at least one electronic device does not install elements of the required software configuration that are present in the current software configuration.

In one embodiment, the test scripts may be prioritized based on a prior test result.

In one embodiment, the test script may be modified based on a prior test result.

In one embodiment, the method may further include deduplicating test features.

In one embodiment, the method may further include removing test features that have been successfully tested in a prior test.

In one embodiment, the required software configuration may include at least one of an installed operating system, an installed firmware version, and an installed software program.

In one embodiment, the installed operating system or firmware version may be an earlier version of a current operating system or firmware.

In one embodiment, at least one electronic device may include a plurality of different device types, a plurality of different versions of the electronic device, etc.

In one embodiment, the at least one electronic device may be provided in a device farm.

In one embodiment, the device farm may be sandboxed.

In one embodiment, the device farm may be remote from the electronic device testing apparatus.

In one embodiment, a plurality of device farms may be provided, and the device farms are logically integrated into a single device farm.

In one embodiment, the step of parsing the one or more test requests to identify the features to be tested may include grammatically parsing the one or more test requests to identify the features to be tested.

In one embodiment, the test features may be executed on a plurality of electronic devices simultaneously.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

The present disclosure generally relates to systems and methods for remote mobile development and test feedback.

Embodiments may intelligently identify the devices tests need to run by analyzing source code, building and performing tests attached to a custom mobile cloud hardware farm with remotely triggered firmware upgrade and downgrade capability (e.g., a test bed setup with mock and without mock). An intelligent feedback loop, which may be based on prior tests and code fixes, with mapping to the code may be used.

Figure 1:
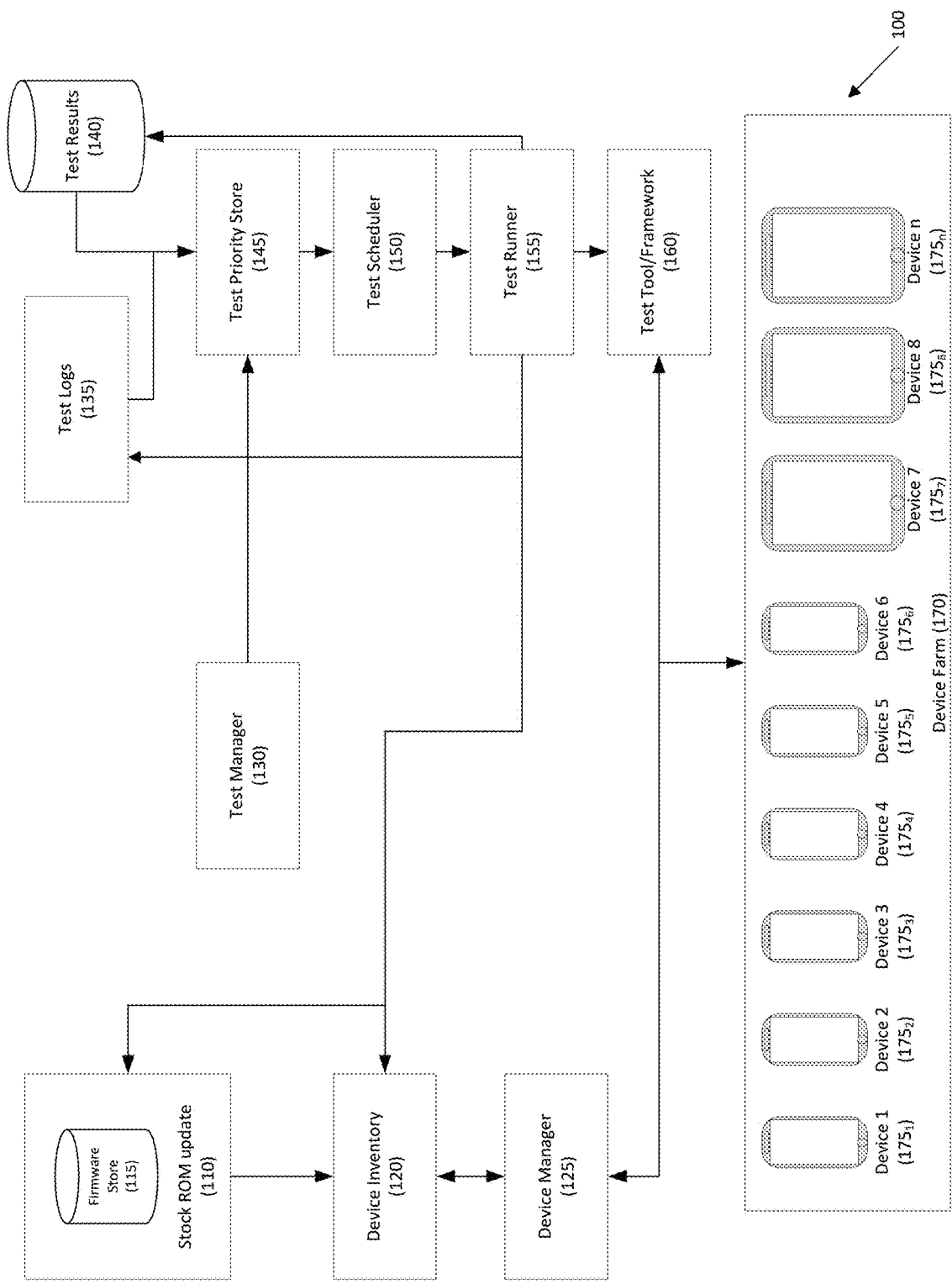
FIG. 1 depicts a system for remote mobile development and test feedback according to one embodiment.

Referring to FIG. 1, a system for remote mobile development and test feedback is disclosed according to one embodiment. System 100 may include stock ROM update 110, which may include firmware or operating system store 115; device inventory 120, device manager 125, test manager 140, test logs 135, test results 140, test priority store 145, test scheduler 150, test runner 155, test tool/framework 160, and device farm 150 which may include one or more devices 175.

Stock ROM update 110 may maintain one or more operating system and/or firmware versions for the devices. For example, stock ROM update 110 may include the current operating system/firmware version for a device as well as one or more prior operating systems/firmware versions for the devices.

Device inventory 120 may maintain an inventory of available devices (e.g., smartphones, tablet computer, smart watches, smart rings, Internet of Things (IoT) devices, etc.). Device manager 120 may query devices 170 in device farm for their current configuration (e.g., firmware, operating system, loaded software, etc.) in real-time, periodically, on demand, etc.

Device manager 125 may manage devices 175 in device farm 170. In one embodiment, device manager 125 may manage the software (e.g., firmware, operating system, apps, etc.) that is installed on each device 175. In one embodiment, device manager 125 may interface with test tool/framework 160 to receive an identification of the required software for each device 175, and may control the installation of the required software on each device 175. For example, device manager 125 may query test tool/framework 160 for the identification of the required software, or test tool/framework 160 may provide device manager 125 with the identification of the required software. Device manager 125 may then install the software on device(s) as is necessary and/or desired.

Test manager 130 may manage the execution of the test(s) on one or more device 175. In one embodiment, test manager 130 may identify the features to test, the device type to test, the firmware or operating system or other software to be installed on device 175 etc.

In one embodiment, a user may interface with test manager 130 to submit test requests. The user may interface using a browser, etc.

Test logs 135 may maintain a record of the tests run on devices 175, as well as the circumstances of the test (e.g., device type, firmware version, operating system and other software installed, etc.).

Test results 140 may maintain a record of the results of the tests run on devices 175.

Test priority store 145 may identify which test(s) to run in order to achieve the desired testing. In one embodiment, test priority store 145 may prevent duplicate testing of the same feature(s). For example, if two tests are requested (e.g., by different developers), but one of the tests is a subset of the others, test priority store 145 will only run the test that includes all feature instead of running both.

In one embodiment, machine learning and/or artificial intelligence may be used to identify may be used to identify the tests to run and/or to prioritize the tests.

In embodiment, instead of executing duplicate tests, test priority store 145 may return the test result for any duplicate tests rather than running the test again. For example, test priority store 145 may identify the features that were tested, similar firmware/operating system, user levels, etc. for which a prior test would apply.

In one embodiment, test priority store 145 may parse grammar for the requested tests in order to identify the features to test. For example, a test may be provided in a language, such as Gherkin, and the test priority store may identify the features to test. Any suitable format for receiving the test request may be used as is necessary and/or desired.

Test scheduler 150 may schedule the test(s) on devices 175, and may instruct test runner 155 to initiate the test(s).

Test tool/framework 160 may execute the test scripts on devices 175.

Device farm 170 may include devices 175 that are under test. Devices 175 may include different device types (e.g., smartphone, tablet, smartwatch, smart rings, IoT devices, etc.), different versions, etc. Device farm 170 may remotely located from where the test is run, and may be in a secure (e.g., sandboxed) environment. In one embodiment, multiple device farms 170 may be provided, at different locations. Multiple device farms 170 may integrate into a single device farm 170.

In one embodiment, device farm 170 may provide APIs for interfacing with devices 175.

Figure 2:
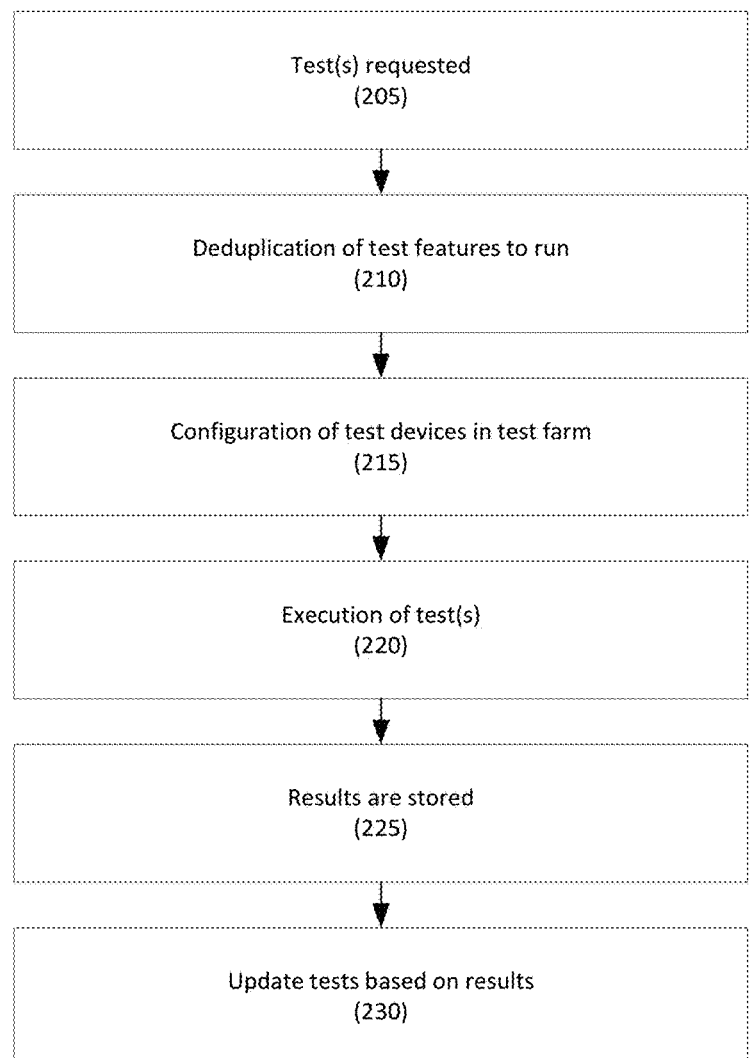
FIG. 2 depicts a method for remote mobile development and test feedback according to one embodiment.

Referring to FIG. 2, a method for remote mobile development and test feedback is disclosed according to one embodiment.

In step 205, one or more test to be conducted may be received. In one embodiment, the tests may be received from one or more remote tester, such as remote developers, etc.

The tests requests may be received in any suitable format.

In step 210, the tests may be de-duplicated so that test features are not unnecessarily repeated. In one embodiment, this may include parsing the test request(s) to identify the features to be tested, and identifying one or more test script that encompasses the features to be tested.

In one embodiment, the features to test may be prioritized.

In step 215, the devices to be tested in the test farm may be configured. For example, the devices may be configured with the appropriate operating system/firmware version and any other software that be installed on the device for testing.

In one embodiment, the current software on the device(s) may be compared to the required software for the test, and the required software may be installed on the device as necessary.

In step 220, the tests may be executed on the device(s), and in step 225, the results of the tests may be stored.

In step 230, the test results may be used to modify tests or test scripts for future testing. For example, if a test routinely fails, or has some other issue, the test may not be used until the issue with the test is resolved. The test results may also modify the test prioritization.

Although several embodiments have been disclosed, it should be recognized that these embodiments are not mutually exclusive, and features from one embodiment may be used with others.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for remote mobile development and test feedback, comprising:
   in an electronic device testing apparatus comprising at least one computer processor:
      receiving a test request comprising one or more tests to conduct on at least one electronic device in a device farm, wherein the test request is written in a domain-oriented language;
      parsing the domain-oriented language to identify test features to be tested;
      identifying one or more test scripts that encompasses the features to be tested, wherein the test scripts are prioritized based on a prior test result;
      deduplicating test features, including removing test features that have been successfully tested in a prior test;
      identifying a required software configuration on the at least one electronic device to conduct the one or more tests;
      installing the required software configuration on the at least one electronic device;
      executing the test features; and
      storing results of the test features.

2. The method of claim 1, further comprising:
   prioritizing the features to be tested.

3. The method of claim 2, wherein the features to be tested are prioritized based on a prior test result.

4. The method of claim 1, further comprising:
   identifying a current software configuration on the at least one electronic device;
   wherein the step of installing the required software configuration on the at least one electronic device does not install elements of the required software configuration that are present in the current software configuration.

5. The method of claim 1, wherein the domain-oriented language is Gherkin.

6. The method of claim 1, wherein the test script are modified based on a prior test result.

7. The method of claim 1, wherein the required software configuration comprises at least one of an installed operating system, an installed firmware version, and an installed software program.

8. The method of claim 7, wherein the installed operating system or firmware version is an earlier version of a current operating system or firmware.

9. The method of claim 1, wherein the at least one electronic device comprises a plurality of different device types.

10. The method of claim 1, wherein the at least one electronic device comprises a plurality of different versions of the electronic device.

11. The method of claim 1, wherein the device farm is sandboxed.

12. The method of claim 1, wherein the device farm is remote from the electronic device testing apparatus.

13. The method of claim 1, wherein a plurality of device farms are provided, and the device farms are logically integrated into a single device farm.

14. The method of claim 1, wherein the test features are executed on a plurality of electronic devices simultaneously.

\* \* \* \* \*